United States Patent [19]
Hehl

[11] Patent Number: 5,182,118
[45] Date of Patent: Jan. 26, 1993

[54] PLASTICIZING APPARATUS FOR USE IN AN INJECTION MOLDING MACHINE

[76] Inventor: Karl Hehl, Arthur-Hehl-Str. 32, D-7298 Lossburg 1, Fed. Rep. of Germany

[21] Appl. No.: 774,211

[22] Filed: Oct. 10, 1991

[30] Foreign Application Priority Data

Nov. 2, 1990 [DE] Fed. Rep. of Germany ....... 4034784
Feb. 23, 1991 [DE] Fed. Rep. of Germany ....... 4105727

[51] Int. Cl.$^5$ .................... B29C 45/17; B29C 45/23
[52] U.S. Cl. .................... 425/192 R; 425/562; 425/563; 425/564; 425/567
[58] Field of Search .............. 425/190, 192 R, 557, 425/561, 564, 562, 563, 566, 191, 183, 567

[56] References Cited

U.S. PATENT DOCUMENTS

| | | | |
|---|---|---|---|
| 2,567,693 | 9/1951 | Brunner | 425/567 |
| 3,319,299 | 5/1967 | Kiraly | 425/564 |
| 3,676,535 | 7/1972 | Juel | 425/192 R |
| 4,704,078 | 11/1987 | Hehl | 425/192 R |
| 4,842,507 | 6/1989 | Kawaguchi et al. | 425/382.4 |
| 4,846,652 | 7/1989 | Hehl | 425/190 |
| 4,886,439 | 12/1989 | Hehl | 425/190 |

FOREIGN PATENT DOCUMENTS

| | | |
|---|---|---|
| 1020786 | 12/1957 | Fed. Rep. of Germany . |
| 1778478 | 8/1971 | Fed. Rep. of Germany . |
| 1273414 | 9/1961 | France . |
| 1387416 | 3/1975 | United Kingdom . |

Primary Examiner—Jay H. Woo
Assistant Examiner—Khanh P. Nguyen
Attorney, Agent, or Firm—Spencer, Frank & Schneider

[57] ABSTRACT

In the plasticizing cylinder the plasticized plastic material is transported by a rotating feed screw into a space which is in front of the feed screw and the plastic material is subsequently injected into the injection mold of the injection molding machine by an axial discharge stroke of the feed screw. During that stroke a backflow-preventing valve is effective to seal a high-pressure space from a low-pressure space, which contains the feed screw. The plasticizing cylinder is composed of a cylinder head, which always completely encloses the high-pressure space and the backflow-preventing valve, and a cylinder shank, which encloses the low-pressure space and the feed screw. Even when the feed screw is in its rearmost initial position will the high-pressure space not be adjoined by a joint which leads to the outside of the plasticizing cylinder so that the problems previously encountered in connection with the sealing of the high-pressure space are avoided.

10 Claims, 7 Drawing Sheets

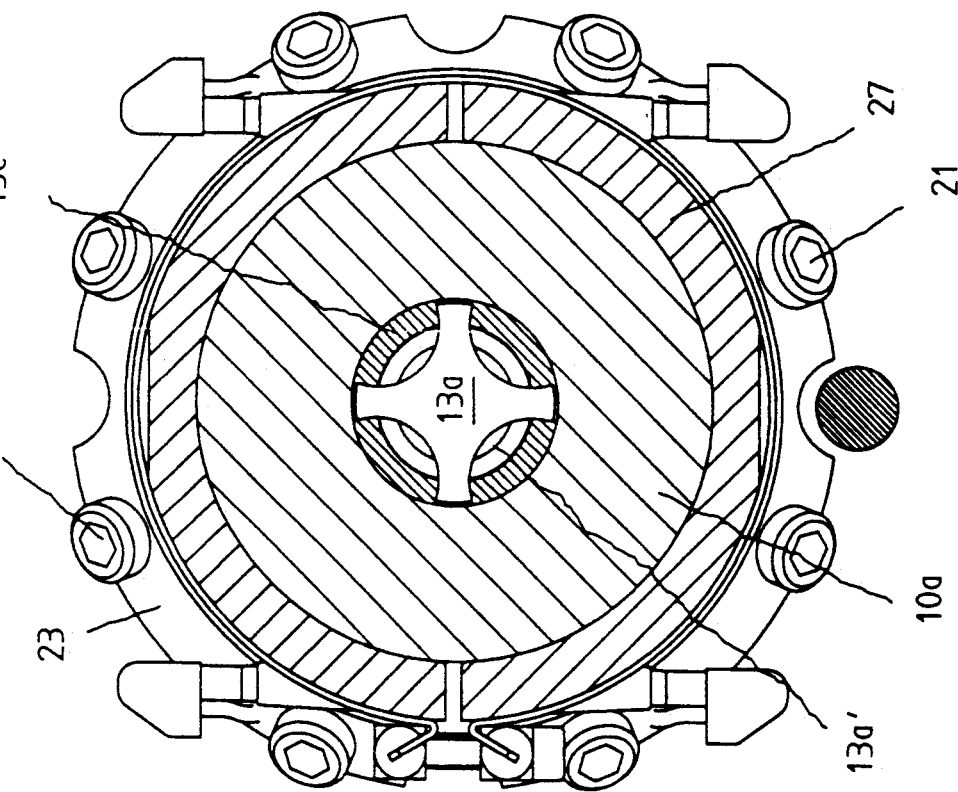
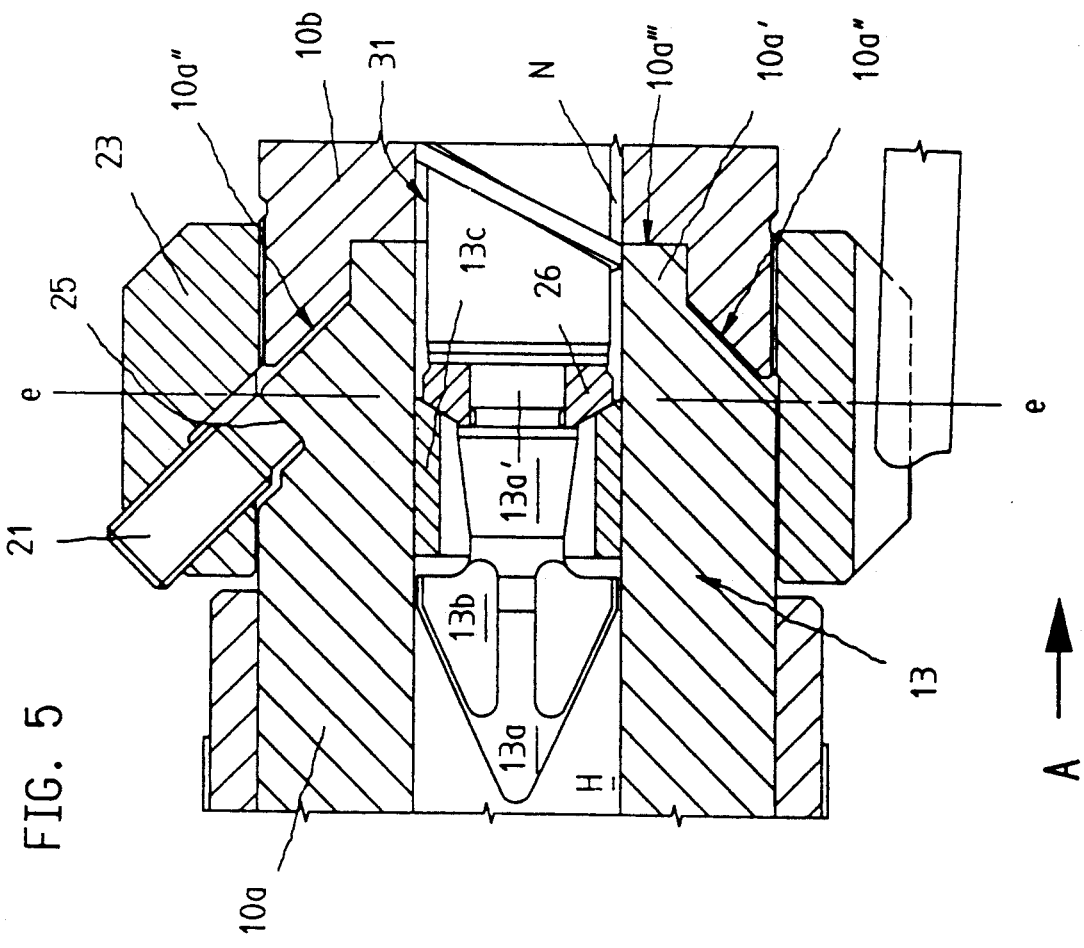

PLASTICIZING APPARATUS FOR USE IN AN INJECTION MOLDING MACHINE

BACKGROUND OF THE INVENTION

1. Field of the Invention

This invention relates to a plasticizing apparatus for use in an injection molding machine, which apparatus comprises a plasticizing cylinder having an inside peripheral surface, which defines a cylindrical plasticizing chamber, which has a conical portion leading into a centrally disposed discharge passage, a rotatable feed screw, which is disposed in the plasticizing chamber and feeds the plasticized plastic material into a portion of the plasticizing chamber in front of the feed screw as the latter yields rearwardly, and is operable to perform a discharge stroke, by which the plastic material is injected into the injection mold of the injection molding machine.

In connection with such a plasticizing apparatus the term "high-pressure space" is used herein to describe the space which during the injection of the plastic material into the injection mold is disposed in front of the backflow-preventing valve and which is hermetically sealed from the "low-pressure space". The maximum volume of that high-pressure space is determined by the rearmost initial position of the feed screw. A distinction must be made between the rearmost initial position and the instantaneous rear initial position of the feed screw; the latter position will be determined by the quantity of plastic material which is to be discharged when a given molding is to be made and varies in dependence on the size of the moldings because only the quantity of plastic material which is required to make a given molding will be accumulated in each injection molding cycle in front of the feed screw.

2. Description of the Prior Art

The previously employed plasticizing cylinders are made as one-piece hollow cylinders (see, e.g., U.S. Pat. No. 4,886,439) and are closed at their forward end by a nozzle body, which has radial and axial sealing surfaces in contact with mating sealing surfaces of the plasticizing cylinder. The joint between the nozzle body and the plasticizing cylinder adjoins the high-pressure space at the inside peripheral surface of the plasticizing cylinder. The length of the circular line on which said joint is subjected to the pressure in the high-pressure space during the discharge of the plastic material is relatively large because it is determined by the inside diameter of the high-pressure space. The pressure built up in the high-pressure space during the discharge stroke may be as high as 2,500 bars or more and is applied to the high-pressure side of said joint throughout its length. In order to ensure an adequate seal between the nozzle body and the cylinder, the nozzle body must axially be forced against the sealing surfaces of the cylinder under an extremely high contact pressure, which is usually applied by an axial movement of a screw-threaded element. To build up said contact pressure, a very high torque must be exerted on the screw-threaded element and such torques can be exerted only by considerable manual forces and/or by means of relatively large tools. It must be borne in mind that an exchange of nozzles will have to be performed in the premises of the user of the injection molding machine either by an employee of said user or by a service technician of the manufacturer of the machine. An exchange of the nozzle will give rise to problems if highly skilled labor and suitable tools are not available, as may particularly occur in developing countries. Injection moldings are increasingly required to meet certain specifications but this requires the use of plastic materials or mixed plastic materials which can be injection-molded only with special injection molding technologies. Such plastic materials or mixed plastic materials which are required may release gases under the extreme pressure built up in the high-pressure space if said gases can escape through the joint between the cylinder and nozzle body.

In general, the nozzle body must be relatively long, as is also the case in plasticizing units as disclosed in U.S. Pat. No. 4,886,439, so that the discharge passage is long too because a considerable part of the axial length of the nozzle body is required to interlock the nozzle body with the cylinder and another axial length portion of the nozzle body is required for the attaching of retaining means for a thermocouple and/or for a valve needle. A relatively long discharge passage will result in a correspondingly high pressure drop in the plastic material as it is discharged.

Another plasticizing apparatus known from U.S. Pat. No. 4,842,507 comprises a bipartite plasticizing cylinder, in which a rear cylinder section, which is relatively small in outside and inside diameter, extends into a forward cylinder section, which is relatively large in outside and inside diameter, and the joint between the two cylinder sections adjoins the high-pressure space throughout the injecting operation.

SUMMARY OF THE INVENTION

It is an object of the invention so to improve a plasticizing apparatus which is of the kind described first hereinbefore that the problems set forth hereinbefore and arising in the mounting and exchange of a nozzle and the sealing of the high-pressure space are substantially eliminated.

In accordance with the invention that object is accomplished in that the plasticizing cylinder comprises a cylinder head, which always completely encloses the high-pressure space and the backflow-preventing valve even when the feed screw is in its rearmost initial position, and a cylinder shank, which encloses the low-pressure space and the feed screw, the joint between the plasticizing cylinder head and the cylinder shank adjoins the low-pressure space on a circular line on the inside peripheral surface which defines the plasticizing chamber, and the cylinder head and the cylinder shank have finish-machined confronting sealing surfaces, which are adapted to be axially forced against each other by pressure-applying means.

In the plasticizing apparatus in accordance with the invention the joint between the cylinder head and the cylinder shank does not adjoin the high-pressure space because even when the feed screw is in its rearmost initial position will the high-pressure space completely be enclosed by a cylinder head and will the joint between the cylinder head and the cylinder shank adjoin the low-pressure space, in which pressures are built up which are much lower than the pressure in the high-pressure space and may amount, e.g., to about 250 bars.

If the plasticizing cylinder in accordance with the invention is provided with a more highly alloyed, separate nozzle body, the joint between such nozzle body and the plasticizing cylinder will extend within the axial extent of the discharge passage so that the length of the joint to which high pressure is applied during the discharge of the plastic material will be only a fractional part of the length of the line along which the joint between the nozzle body and the conventional plasticizing cylinders is exposed to the pressure in the high-pressure space. For this reason it is no longer necessary to join the nozzle body and the plasticizing cylinder by interlocking means having relatively large axial and radial sealing surfaces but it will be sufficient to join the nozzle body to the cylinder head on sealing surfaces which lie in a plane that is transverse to the injection axis whereas appreciable interlocking means are not required. This permits the use of an extremely short nozzle body so that the discharge passage is extremely short too.

The present invention is not affected by the disclosure of U.S. Pat. No. 4,842,507 because the object of the present invention cannot be accomplished by the known plasticizing cylinder, in which the joint between the two cylinder sections adjoins the high-pressure space throughout the injecting operation. As a result, the forward cylinder section cannot enclose the high-pressure space even when the feed screw is in its rearmost initial position, as is called for by the invention, in accordance with which that joint always adjoins the low-pressure space. Besides, that known plasticizing cylinder also fails to embody the remaining features of the improvement set forth in claim 1.

According to a further feature of the invention a sleeve is provided, which axially overlaps the cylinder head and the cylinder shank and is secured to the cylinder shank, and the cylinder head is adapted to be axially forced against the cylinder shank by means of clamp screws, which are screwed through tapped through bores formed in the sleeve and have end faces which engage abutment surfaces of the cylinder head. In that case the axial contact pressure between the cylinder head and the cylinder shank is produced by a plurality of screw-threaded elements, which are provided on a circular line. If the contact pressure is thus distributed to a plural numerous pressure-applying elements, it will be possible during the assembling and servicing of the plasticizing apparatus to remove the cylinder head from the cylinder shank or to exchange the cylinder head by an exertion of relatively small physical forces and with the aid of relatively simple tooling.

In the embodiment shown in FIGS. 1 to 10 the sleeve which is screwed to the cylinder shank axially overlaps the low-pressure and high-pressure spaces when the feed screw is in its rearmost initial position and the cylinder head and the cylinder shank have the same outside diameter so that, as distinguished from the embodiment shown in FIGS. 11 and 12, cylinder heads differing in length may selectively be used for special injection molding processes. For instance, an extremely long cylinder head will be required for a special injection molding process in which a dyed plastic material must thoroughly be mixed by mixing means before it is injected. In that case, mixing means connected to the feed screw are provided behind the backflow-preventing valve.

According to a further feature a frustoconical nozzle body having a forward end face and a discharge passage has a finish-ground sealing surface, which in a vertical plane contacts a finish-ground sealing surface of the cylinder head, and the high-pressure space merges into the discharge passage at a distance from said vertical plane. Said distance may be approximately as large as the inside diameter of the discharge passage. The nozzle body may comprise a separate, central nozzle core, which is formed with said forward end face and has a finish-ground sealing surface, which in said vertical plane contacts a mating finish-ground sealing surface of the cylinder head. These features are desirably embodied when it is desired, in order to save costs, to provide the cylinder head in its forward portion with a separate, more highly alloyed nozzle body because the cylinder head is often subjected in that portion to extremely high mechanical and thermal stresses whereas the tight seal of the high-pressure space should not adversely be affected. The problem of sealing the high-pressure space can substantially be alleviated in that case in that the joint between the nozzle body and the remainder of the cylinder head is disposed within the axial extent of the discharge passage and the circular line on which the joint between the nozzle body and the remainder of the cylinder head adjoins the high-pressure space is extremely short. For this reason the axial length of the nozzle body may be very small because the nozzle body has a planar sealing surface, which is at right angles to the injection axis and contacts the remainder of the cylinder head. Because the discharge passage is extremely short, its inside diameter may also be smaller without an occurrence of a substantial pressure drop during the injecting operation. A small inside diameter of the discharge passage will also afford the advantage that a valve needle which is correspondingly small in diameter can be used and can be controlled by a much weaker force.

The cylinder shank may be larger in diameter than the cylinder head and may have a portion which surrounds the cylinder head and which extends as far as to the forward portion of the high-pressure space when the feed screw is in its rearmost initial position. That portion of the cylinder shank which surrounds the cylinder head may terminate adjacent to the conical portion by which the plasticizing chamber merges into the discharge passage. The clamp screws may be screwed through tapped bores formed in an internal flange of the sleeve. In that case the cylinder head is relatively light in weight and can easily be handled as it is exchanged.

According to a further feature the cylinder head and the cylinder shank have finish-machined confronting sealing surfaces, which are in contact with each other, and the joint between the cylinder head and the cylinder shank has an annular portion which extends in a vertical plane and adjoins the low-pressure space and is defined by said sealing surfaces. Because the surfaces forced against each other are small, the contact pressure is high and the seal is tight.

BRIEF DESCRIPTION OF THE DRAWING

FIG. 5 is an enlarged fragmentary view showing a portion of FIG. 4.

FIG. 6 is an elevation showing the arrangement of FIG. 5 viewed in the direction A.

DETAILED DESCRIPTION OF THE PREFERRED EMBODIMENTS

Illustrative embodiments of the invention will now be described more in detail.

Figure 1:
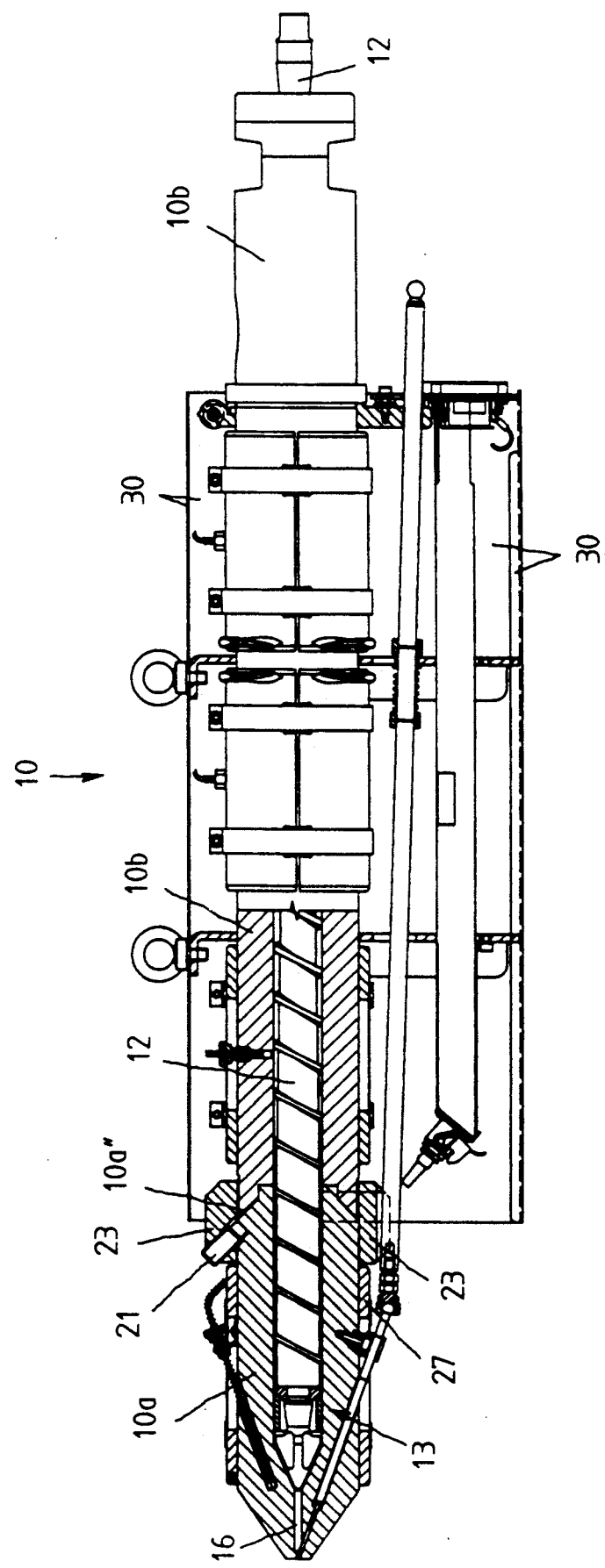
FIG. 1 is a side elevation showing the plasticizing cylinder partly cut open.
Figure 2:
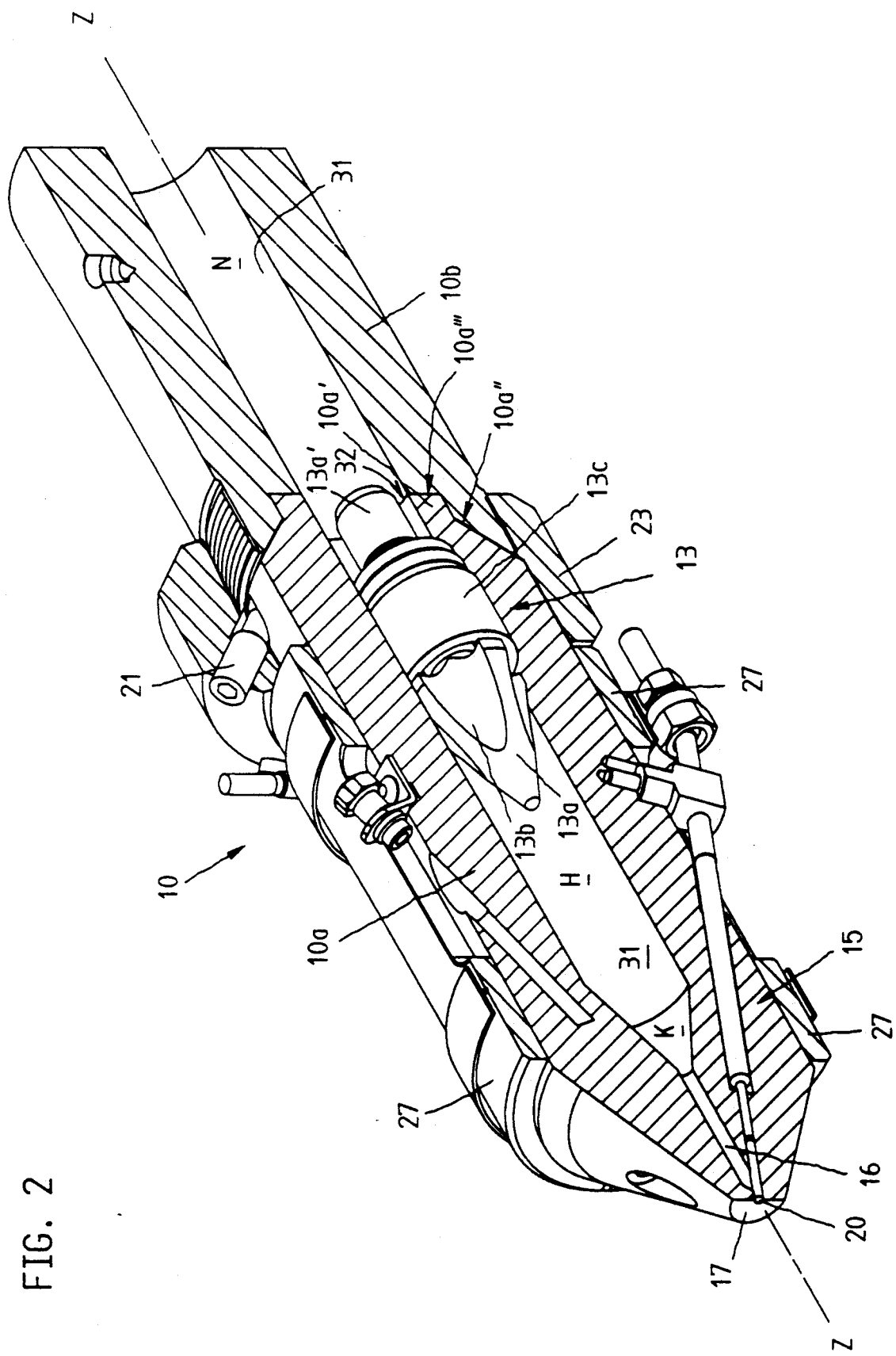
FIG. 2 is an enlarged fragmentary perspective view showing a portion of FIG. 1.
Figure 3:
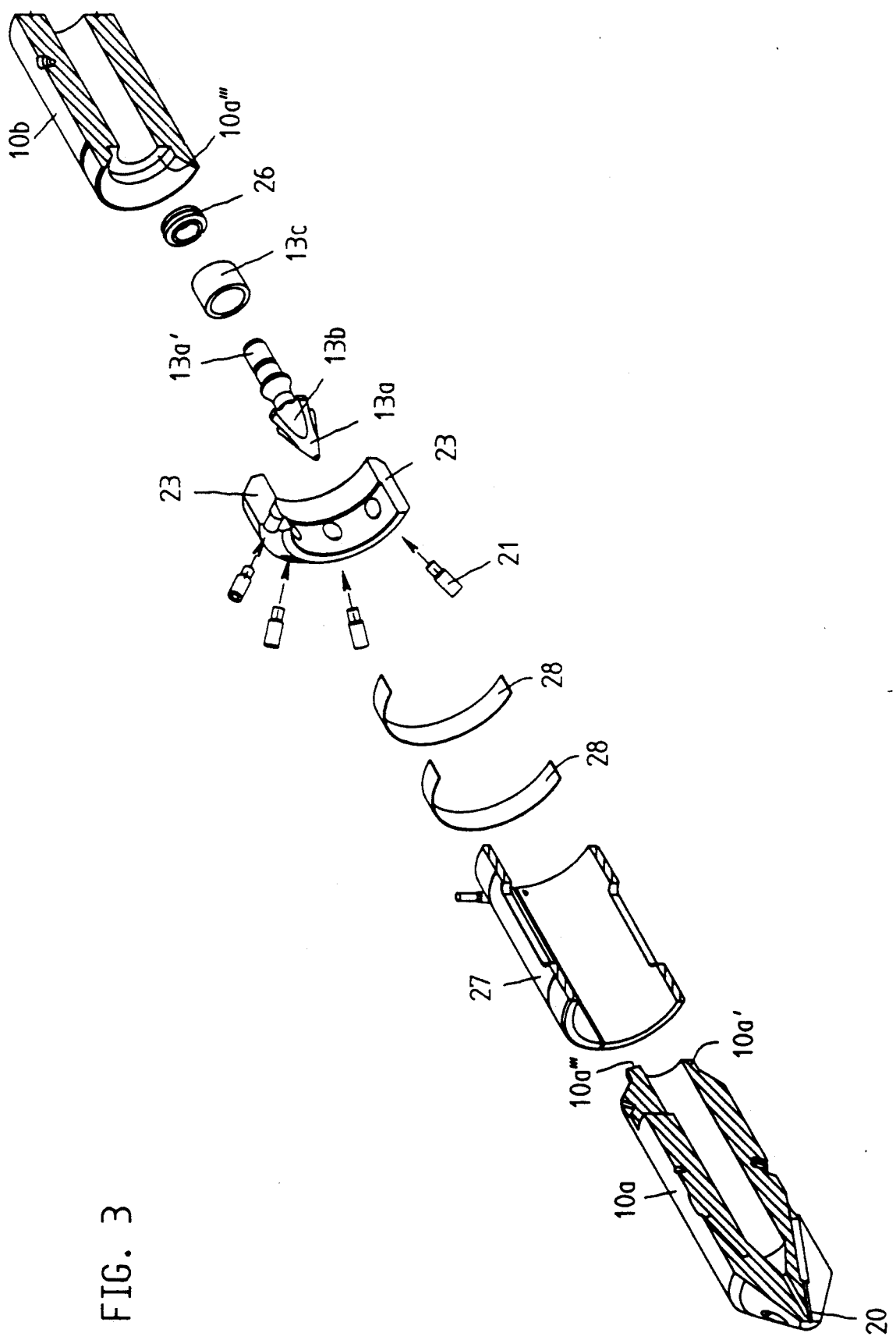
FIG. 3 is an exploded view showing the same portion as FIG. 2 on a smaller scale.
Figure 4:
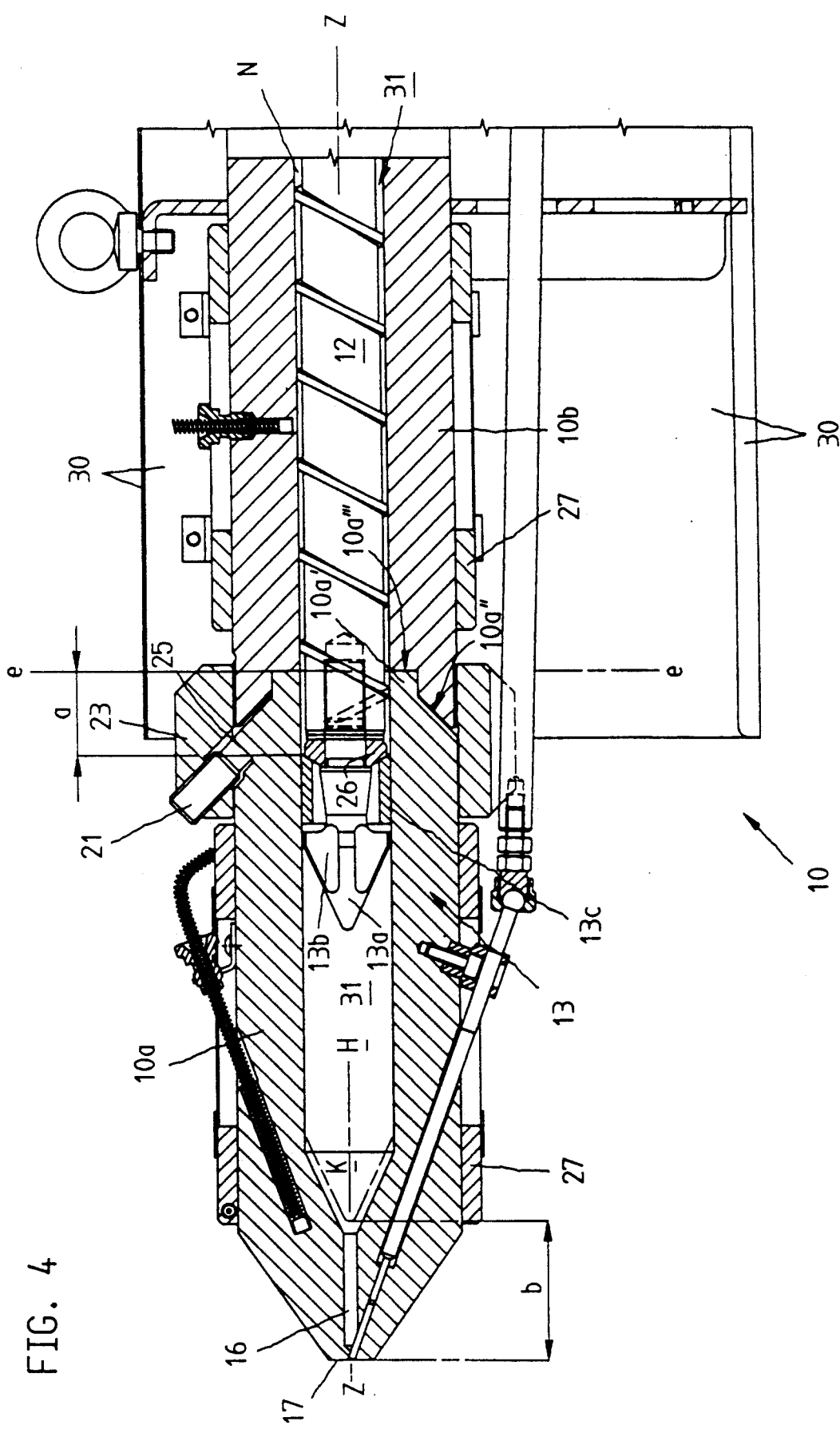
FIG. 4 is an enlarged fragmentary view showing a portion of FIG. 1.

The cylindrical plasticizing chamber of the heatable plasticizing cylinder 10 contains a rotatably mounted feed screw 12, which during the plasticizing operation transports the plasticized plastic material into a space which is in front of the feed screw 12, which yields rearwardly. After the plasticizing operation the plasticized plastic material which has been accumulated in front of the feed screw 12 is injected by a forward discharge stroke of the feed screw 12 through a discharge passage 16 into the injection mold of the injection molding machine. At the beginning of that discharge stroke, a backflow-preventing valve 13 becomes effective to seal a high-pressure space H, which is gradually decreased during the discharge stroke of the feed screw 12, from a low-pressure space N, which contains the feed screw 12. The backflow-preventing valve 13 comprises a head 13a, which is formed with axial passages 13b and a sealing ring 13c, which is capable of a limited axial displacement. When the backflow-preventing valve is effective the sealing ring 13c engages a ring 26 of the feed screw 12 whereas when the backflow-preventing valve is ineffective the sealing ring 13c engages the forward side of the head 13a. Heating cuffs 27 are forced by means of straps 28 against the outside peripheral surface of the plasticizing cylinder 10, which is surrounded by a guard 30. The plasticizing cylinder 10 is composed of a cylinder head 10a and a cylinder shank 10b, which are easily detachably connected. The cylinder shank 10b completely encloses the feed screw 12 in its rearmost initial position. The cylinder head 10a always completely encloses the high-pressure space H and the backflow-preventing valve 13, even when the feed screw 12 is in its rearmost initial position and the high-pressure space has the largest volume. When the feed screw 12 is in its rearmost initial position, the cylinder head 10a also axially overlaps a forward end portion a (FIG. 4) of the feed screw 12. By clamping means consisting of a sleeve 23 and clamp screws 21 a finish-ground axial flange 10a' of the cylinder head 10b and a mating finish-ground portion of the cylinder shank 10b are axially forced against each other. The axial flange 10a' has a finish-machined sealing surface 10a''' in sealing contact with a finish-machined surface of the mating portion of the cylinder shank 10b. The cylinder head 10a has a shoulder, which is inclined to the axis of the cylinder and adjacent to a joint 10a'' adjoins the cylinder shank 10b. The sleeve 23 axially overlaps both the cylinder head 10a and the cylinder shank 10b and bears axially on the cylinder head 10a by means of clamp screws 21, which are disposed on a circular line and are inclined to the axis z—z of the cylinder and screwed into tapped through bores of the sleeve 23 and bear on abutment surfaces 25 of the cylinder head 10a. That portion of the sleeve 23 which axially overlaps the cylinder shank 10b has internal screw threads in threaded engagement with external screw threads of the cylinder shank 10b. The cylinder head 10a and the cylinder shank 10b can be axially be forced against each other in that the clamp screws 21 are properly tightened.

In the illustrative embodiments shown in FIGS. 1 to 4 the one-piece cylinder head 10a has a cylindrical rear portion and a frustoconical forward portion, which has a section b (FIG. 4), which has a forward end face 17 and is formed with the discharge passage 16.

Figure 7:
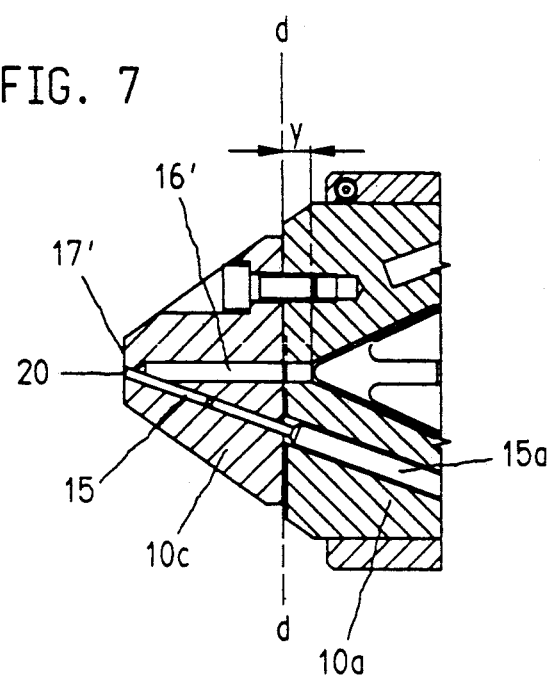
FIG. 7 is a vertical sectional view showing a modified cylinder head, which is provided with a separate nozzle body and is shown as viewed on a section plane through its end portion.
Figure 8:
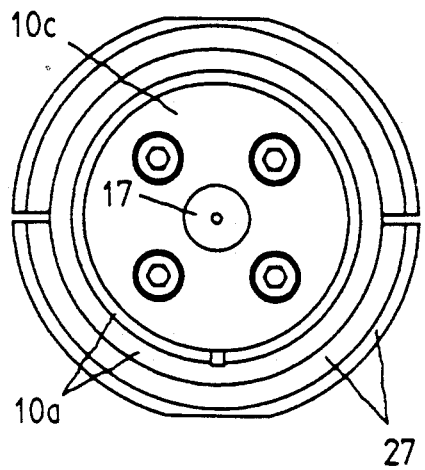
FIG. 8 is an end elevation showing the modification of FIG. 7.
Figure 9:
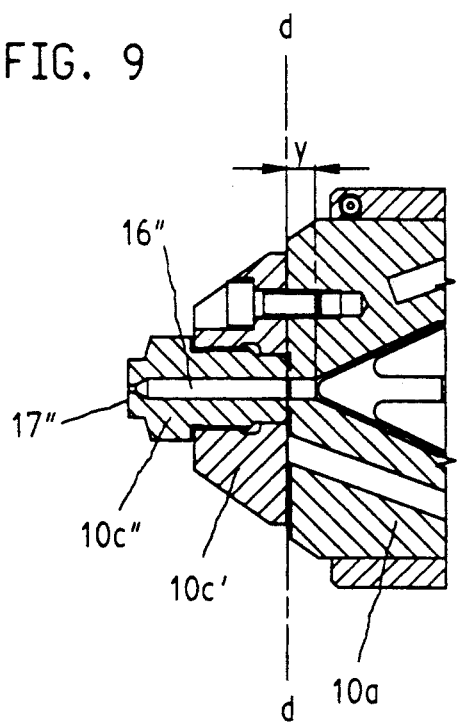
FIG. 9 is a vertical sectional view showing a further modified cylinder head provided with a nozzle body and shown as viewed on a section plane through its end portion.
Figure 10:
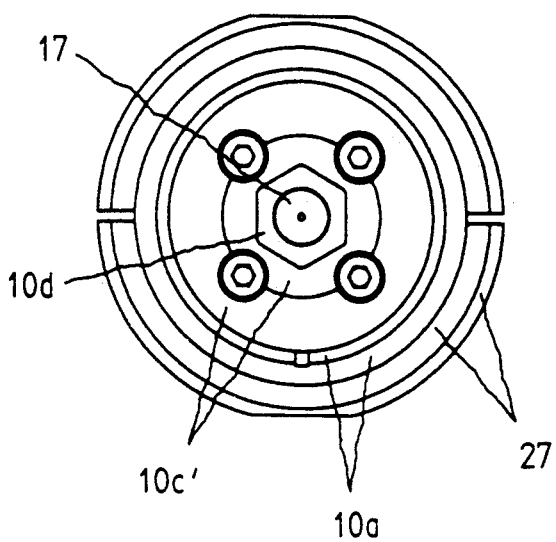
FIG. 10 is an end elevation showing the embodiment of FIG. 9.

In the illustrative embodiments shown in FIGS. 7, 8 and in FIGS. 9, 10, respectively, a nozzle body 10c or 10c' is provided, which has a finish-ground sealing surface in contact with a finish-ground sealing surface of the cylinder head 10a. The nozzle body 10c or 10c' has a forward end face 17' or 17'' and is formed with a discharge passage 16' or 16''. The confronting finish-ground sealing surfaces of the nozzle body and of the cylinder head extend in a plane d—d, which is at right angles to the axis z—z of the cylinder 10. The high-pressure space H opens into the discharge passage 16 at a distance y (FIGS. 7, 9) behind the plane d—d. The distance y is approximately as large as the inside diameter of the discharge passage 16' or 16''. The forward end of the discharge passage 16 or 16' is spaced behind the forward end face 17 or 17' and opens into an oblique valve needle bore 20, which is smaller in inside diameter than the discharge passage.

In the embodiment shown in FIGS. 9 and 10 the nozzle body 10c' comprises a centrally disposed, separate nozzle core 10c'', which is formed with the forward end face 17'' and with the forward portion of the discharge passage 16'' and has a finish-ground sealing surface that extends in the plane d—d and contacts a mating finish-ground sealing surface of the cylinder head 10a. As is particularly apparent from FIGS. 2 and 4 the sleeve 23 has a vertical plane of symmetry e—e (FIG. 5), which axially overlaps the low-pressure space N and the high-pressure space H when the feed screw 12 is in its rearmost initial position.

Figure 11:
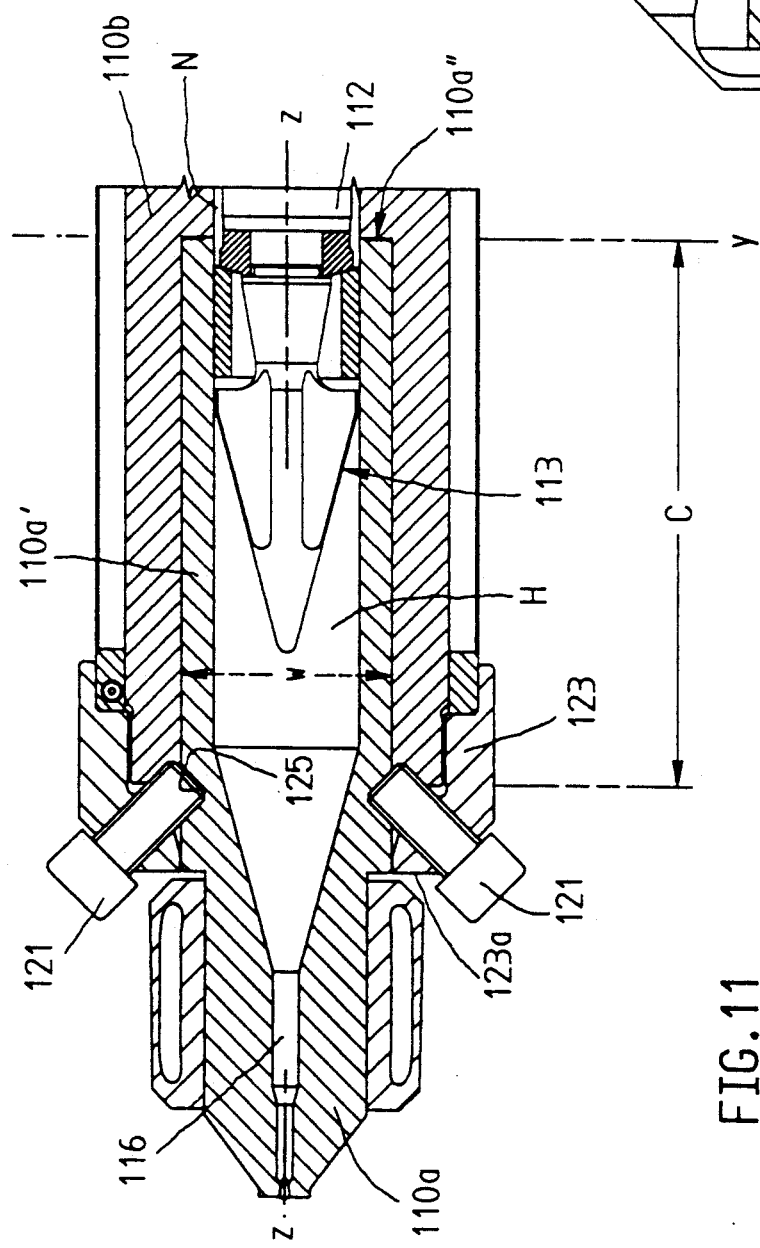
FIGS. 11 and 12 are views corresponding to FIG. 4 and show a modified plasticizing apparatus.
Figure 12:
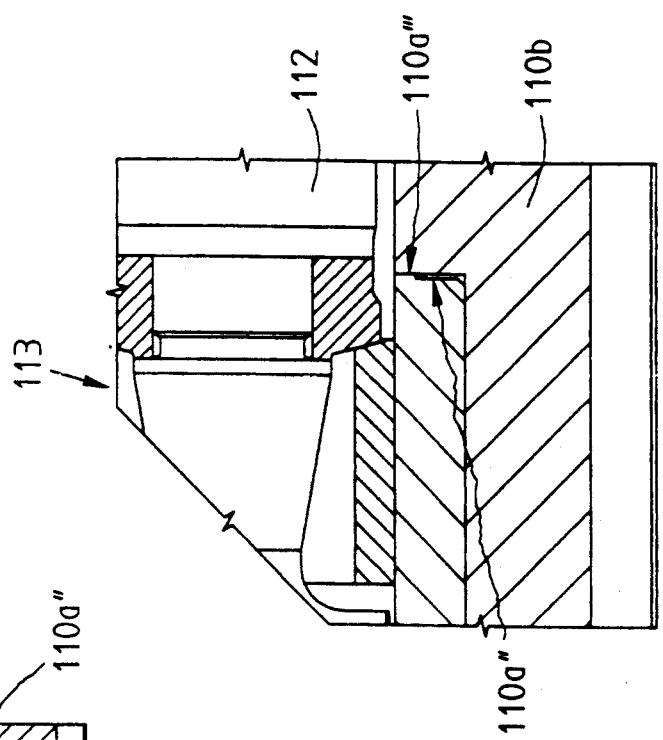

In the illustrative embodiment shown in FIGS. 11 and 12 the cylinder head 110a is smaller in diameter than the cylinder shank 110b and is surrounded by a portion c of the cylinder shank 110b, which portion c has an inside diameter w, which exceeds the outside diameter of the cylinder head 110a. Even when the feed screw 112 is in its rearmost initial position the portion c extends axially as far as to the forward portion of the high-pressure space H. Even when the feed screw 112 is in its foremost position does the portion c having a relatively large inside diameter terminate adjacent to the high-pressure space H. A sleeve 123 axially overlaps both the cylinder head 110a and the cylinder shank 110b and has internal screw threads in threaded engagement with external screw threads of the cylinder shank 110b. By means of clamp screws 121 the axial flange 110a' of the cylinder head 110a can axially be forced against the cylinder shank 110b. The clamp screws 121 are screwed into tapped through bores formed in an internal flange 123a of the sleeve 123 and are thus axially supported by said sleeve and have inner end faces bearing on abutment surfaces 125 of the cylinder head 110a. The clamp screws 121 are disposed on a circular line and their axes include an angle of about 45° with the axis z—z of the cylinder. The axially confronting surfaces of the axial flange 110a' of the cylinder head 110a and of the cylinder shank 110b are finish-machined and contact each other only in a small annular portion 110''' (FIG. 12) of the joint 110a''; that portion 110a''' adjoins the low-pressure space N. Because that portion 110a''' is small, a relatively high contact pressure per unit of area is applied in that portion.

I claim:

1. In a plasticizing apparatus for use in an injection molding machine, which apparatus comprises
    a plasticizing cylinder formed with at least part of a central discharge passage and with an inside peripheral surface, which defines a cylindrical plasticizing chamber having a conical forward portion merging into said discharge passage;
    a feed screw, which has forward and rear ends and is disposed in said plasticizing chamber and mounted to be rotatable and axially movable and rotatable to feed plasticizing plastic material from said rear end to said forward end; and
    a backflow-preventing valve, which is mounted on said feed screw at its forward end and defines in said plasticizing chamber a low-pressure space behind said valve and a high-pressure space, which is in front of said valve and adapted to receive and accumulate said plasticized plastic material fed by said feed screw;
    said feed screw being adapted to axially yield rearwardly to said plasticized plastic material accumulating in said high-pressure space and to assume a plurality of rear initial positions and operable to perform from any of said rear initial positions an axial discharge stroke for discharging said plasticized plastic material from said high-pressure space through said discharge passage;
    said backflow-preventing valve being arranged to seal said high-pressure and low-pressure spaces from each other throughout said discharge stroke;
    the improvement wherein
    said plasticizing cylinder comprises a cylinder head and a cylinder shank, which are detachably interconnected;
    said cylinder head encloses said high-pressure space throughout its axial length and also encloses said backflow-preventing valve in all said initial rear positions of said feed screw;
    said cylinder shank encloses said low-pressure space throughout its axial extent and also encloses said feed screw;
    said cylinder head and said cylinder shank have confronting end faces, which define a joint, which along a circular line adjoins said inside peripheral surface at said low-pressure space;
    both said confronting end faces have axially confronting finish-machined sealing surfaces; and
    clamping means are provided for axially forcing said sealing surfaces of said confronting end faces against each other; said clamping means comprises a sleeve overlapping said cylinder head and said cylinder shank and is secured to said cylinder shank and is formed with an annular series of tapped through bores, and
    clamp screws screwed through said tapped through bores and axially bearing on said sleeve and engaging said cylinder head at abutment surfaces formed on said cylinder head.

2. The apparatus set forth in claim 1, wherein said tapped through bores extend radially inwardly and rearwardly.

3. The apparatus set forth in claim 1, wherein
    said sleeve comprises an internal flange formed with said tapped through bores.

4. The apparatus set forth in claim 1, wherein
    said sleeve is screwed to said cylinder shank and when said feed screw is in the rearmost of said rear initial positions said sleeve axially overlaps both said high-pressure and low-pressure spaces; and
    said cylinder head and cylinder shank have the same outside diameter.

5. The apparatus set forth in claim 1, wherein
    said discharge passage has a forward portion extending in a frustoconical nozzle body, which has a forward end face and a rearwardly facing finish-ground sealing surface,
    said cylinder head has a forwardly facing finish-ground sealing surface extending in a vertical plane and in contact with said sealing surface of said nozzle body, and
    said discharge passage has a rear portion formed in said cylinder head and opening into said high-pressure space at a distance behind said vertical plane.

6. The apparatus set forth in claim 5, wherein said distance is approximately as large as the inside diameter of said discharge passage.

7. The apparatus set forth in claim 5, wherein
    said nozzle body comprises a centrally disposed, separate nozzle core, which is formed with said forward end face, with said forward portion of said discharge passage, and with said finish-ground sealing surface of said nozzle body.

8. The apparatus set forth in claim 1, wherein
    said cylinder shank is larger in outside diameter than said cylinder head and axially overlaps said cylinder head in an axial range which extends adjacent to a forward portion of said high-pressure space when said feed screw is in the rearmost of said rear initial positions.

9. The apparatus set forth in claim 8, wherein said cylinder shank axially overlaps said cylinder head as far as to said conical portion of said plasticizing chamber.

10. The apparatus set forth in claim 1, wherein
    said joint has a vertical portion extending in a vertical plane and adjoining said low-pressure space, and
    said sealing surfaces of said cylinder head and of said cylinder shank define said joint only in a part of the width of said vertical portion adjacent to said low-pressure space.

* * * * *